Sept. 8, 1970    V. I. EFIMENKO ET AL    3,528,010
MEASURING INSTRUMENT HAVING A MOVABLE IRON MEMBER
Filed Nov. 7, 1966                                    3 Sheets-Sheet 1

United States Patent Office 3,528,010
Patented Sept. 8, 1970

3,528,010
MEASURING INSTRUMENT HAVING A MOVABLE IRON MEMBER
Viktor Ivanovich Efimenko, Ulitsa Vystavochnaya 3, kv. 17, Krasnodar, U.S.S.R.; Konstantin Konstantinovich Iljunin, Novye Cheremushki, Kvertal 34a, korpus 5, kv. 58, Moscow, U.S.S.R.; and Alexandr Fedorovich Gorodovsky, Ulitsa Mekhanicheskaya 3, kv. 1, Krasnodar, U.S.S.R.
Filed Nov. 7, 1966, Ser. No. 592,371
Int. Cl. G01r 1/00, 1/20
U.S. Cl. 324—146                                     11 Claims

ABSTRACT OF THE DISCLOSURE

A measuring instrument comprises a fixed member of non-permanent magnetic material having split pole-pieces which define a slot, a coil being arranged on said fixed member and a movable iron member being in said slot and mounted on a spindle, the movable member being constituted as a plate asymmetrical to said spindle whereas the pole-pieces are also different in shape and asymmetrical with respect to each other and to said spindle.

---

This invention relates to moving-iron operating parts mainly used in voltmeters, ammeters, detecting and other types of measuring instruments as well as in electromagnetic relays with a hinged armature.

Known in the art are moving-iron operating parts of measuring instruments which comprise movable and fixed ferromagnetic members, of which the fixed member is provided with a measuring coil whose magnetic flux produced by the current flowing therethrough passes consecutively through the fixed and movable iron members and air gaps therebetween and sets up a torque proportional to the current in the measuring coil, and the movable member is associated with the pointer and is mounted for rotation.

One of the known moving-iron operating mechanisms employs as a measuring coil a cylindrical coil with a winding inside which a movable core is mounted asymmetrically with respect to the axis of the coil (cf. FRG Pats. Nos. 1,083,421 and 972,524; cl. 21e, 3$_{02}$). The fixed iron member is mounted on the inner side of the coil. The pivotal axis of the moving element of the instrument coincides with the coil axis and the moving element performs a circular motion when shifting.

Also known is a moving-iron operating mechanism in which the pivotal axis of the movable member is normal to the axis of the measuring coil, and the movable member is adapted to enter the inside portion of the measuring coil (cf. FRG Pat. No. 1,092,562; cl. 21e, 3$_{02}$).

Additionally, there are other known moving-iron operating mechanisms, for example, that in which the fixed ferro-magnetic member accommodates the coil, whereas the movable member is outside the coil and cooperates with the fixed ferromagnetic member (cf. FRG Pat. No. 1,006,062; cl. 21e, 3$_{02}$).

The abovementioned known moving-iron operating mechanisms suffer from the following basic disadvantages. The magnetic flux is considerably dissipated and is not used effectively; they have comparatively low sensitivity; the movable loads directed normally or parallel to the pivotal axis of the movable member affect the suspension.

An object of the present invention is to eliminate the abovementioned disadvantages and to provide a moving-iron operating part of a measuring instrument which is highly sensitive, not complicated in design, and simple to adjust and fit.

Another object of the present invention is to provide a moving-iron operating part for measuring instruments of a high class of accuracy, said operating part being shielded from the effects of external magnetic fields and having approximately linear scale characteristics.

Still another object of the present invention is to provide a scale with suppressed-zero or with a compressed portion, as well as a large-deflection scale for more than 270°.

A further object of the present invention is to provide a moving-iron operating mechanism which is to a great extent universal so that the same moving-iron mechanisms can be employed in instruments having different overall dimensions and different accuracy classes.

The present invention is aimed at maximum utilization of the movable member surface to provide for the increase of the measuring coil inductance.

Accordingly, the present invention contemplates a moving-iron operating mechanism which comprises movable and fixed ferromagnetic members, of which the fixed one is provided with pole-pieces having a slot for accommodating the movable member therein and with a measuring winding whose magnetic flux passes consecutively through the fixed and movable members and the air gaps therebetween and sets up a torque that displaces the movable member having, according to the invention, a shape asymmetrical with respect to its pivotal axis, the fixed member pole-pieces being different in shape and asymmetrical with respect to the movable member pivotal axis.

It is preferable that the ratio of the distance from the pivotal axis of the ferromagnetic movable member to the nearest point on the movable member edge which moves within the slot of the pole-piece more distant from said axis to the distance from the movable member pivotal axis to the point lying on said movable member edge and most remote from said axis be kept within the range of 0.1 to 1, and the distance from the points lying on the edges facing each other of the fixed member pole-pieces to the pivotal axis of the movable member be kept within the range of 0.1 to 3 relative units, assuming for the relative unit the maximum distance from the edge of the movable member to its pivotal axis.

To increase the deflection angle of the pointer, the pole-piece which is more remote from the pivotal axis of the movable member can be made so as to embrace the other pole-piece through an angle of 320°.

Further, it is preferable that with the movable iron member fully deflected, the ratio of the area of the gap formed by the movable iron member and the pole-piece less remote from the pivotal axis of the movable member to the area of the gap formed by the movable member and the pole-piece more remote from said axis be kept within the range of 0.5 and 10.

It is further expedient that the measuring coil be made from wire having resistivity greater than $$0.03 \frac{\text{ohm} \cdot \text{mm.}^2}{\text{m.}}$$

in case the operating mechanism is used in voltmeters.

Other objects and advantages of the invention will become clear from the following description thereof with reference to the accompanying drawings, in which.

Figure 1:
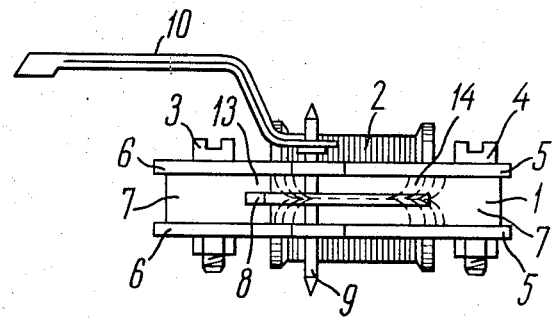
FIGS. 1 and 2 show a moving-iron operating mechanism of the present invention for use in, for example, an ammeter or voltmeter with approximately linear scale.

When describing the embodiments of the present invention shown in the drawings specific terminology is used for the sake of clarity. The invention, however, is not limited by these terms and it should be borne in mind that each term embraces all equivalent elements which operate in a similar way and are used for solving similar problems.

The fixed member (see FIGS. 1 and 2) comprises a main core 1, which accommodates a measuring coil 2 and pole-pieces 5 and 6, both being fastened to said coil by screws 3 and 4.

The pole-pieces 5 and 6 are formed with a longitudinal slot 7. Between the pole-pieces 5 and 6 there is located an iron member 8. A spindle 9 with a pointer 10 and other constructive elements, such as a resilient return member mounted on said spindle and the like (not shown in the drawing) are located near the pole-piece 5, which has a slot 11 with an opening 12 for passing the spindle 9 and for convenient assembly of the operating mechanism.

The pole-piece 6, more remote from the pivotal axis of said movable member, which will hereafter be designated as "external," and the movable member 8 form an air gap 13, while the pole-piece 5, less remote from the pivotal axis of said movable member, and hereafter designated as "internal," and the movable member 8 form an air gap 14.

To achieve high sensitivity at a considerable angle of a movable member 8 is made asymmetrical relative to its pivotal axis 9.

The movable iron member 8, when rotating around the axis 9, moves in the slots 7 of the pole-pieces 5 and 6, thereby changing the permeance of gaps 13 and 14 by changing the areas of the gaps.

The changing of the permeance of the air gaps 13 and 14 depending upon the angle of rotation of the movable member 8 may occur in different ways. In one of these cases $$\frac{dG_{13}}{d\alpha} > 0 \text{ and } \frac{dG_{14}}{d\alpha} > 0 \qquad (1)$$

where $G_1$ is the permeance of the gap 13;
$G_2$ is the permeance of the gap 14;
$\alpha$ is the angle of rotation of the movable member 8.

In this case, the torque designated as $M_{rot}$ is determined by the formula:

$$M_{rot} = \frac{1}{2}\left[\frac{G_{13}^2 dG_{14}}{d\alpha(G_{13}+G_{14})^2} + \frac{G_{14}^2 dG_{13}}{d\alpha(G_{13}+G_{14})^2}\right](JW)^2 \qquad (2)$$

where JW are the ampereturns of the measuring coil 2.

In this case, it is preferable that the relation between the permeances of gaps with full deflection angle of the movable member ($\alpha = \alpha_{max}$) be selected as:

$$\frac{G_{13\,max.}}{G_{14\,max.}} = 1 \qquad (3)$$

where $G_{13\,max}$, $G_{14\,max}$ are the maximum permeances of the gaps 13 and 14, respectively, with full deflection angle.

Another case is when:

$$\frac{dG_{13}}{d\alpha} = 0 \, \frac{dG_{14}}{d\alpha} > =0 \qquad (4)$$

then the torque is determined as:

$$M_{rot} = \frac{1}{2}\frac{G_{13}^2 \cdot dG_{14}}{d\alpha(G_{13}+G_{14})^2} \cdot (JW)^2 \qquad (5)$$

In this case, it is preferable that the relation between the permeances of the gaps with $\alpha = \alpha_{max}$ be selected as $$\frac{G_{13\,max.}}{G_{14\,max.}} = 2 \qquad (6)$$

Still another case is when:

$$\frac{dG_{13}}{d\alpha} < 0, \, \frac{dG_{14}}{d\alpha} > 0 \qquad (7)$$

then the torque is defined:

$$M_{rot} = \frac{1}{2}\left[\frac{dG_{14} \cdot G_{13}^2}{d\alpha(G_{13}+G_{14})^2} - \frac{dG_{13}G_{14}^2}{d\alpha(G_{13}+G_{14})^2}\right](JW)^2 \qquad (8)$$

In this case, it is preferable that the relation between the permeances of the gaps with $\alpha = \alpha_{max}$ be selected as:

$$\frac{G_{13\,max.}}{G_{14\,max.}} = 5 \qquad (9)$$

One more important feature present in every one of the above-mentioned cases is the utilization of almost the whole surface of the movable member (80–95%) with $\alpha = \alpha_{max}$ for producing the air gaps 13 and 14, which make it possible to sufficiently increase the permeance of said gaps at a certain weight of the movable member and thereby to increase the sensitivity of the mechanism.

Gap permeance is known to depend both upon its length and area. Since the length determined by the distance between the movable member and the fixed pole-pieces is usually chosen as small as possible depending upon technological and constructive possibilities, the above-mentioned dependences can be determined mainly as the relation of the areas of the gaps formed by the movable member in combination with the internal and external pole-pieces, as the relation of the dimensions of the movable member and pole-pieces and as the relation of the movable member weight.

According to this, it is preferable that the ratio of the distance from the center of rotation of the movable iron member to the point nearest to this center and lying on that edge of the movable member which moves in the slot of the external pole-piece to the distance from the center of rotation of the movable member to the point most remote from said center and lying on the same edge of the movable member be kept within the range of 0.1 to 1; and the distance from the points lying on the edges of the external and internal pole-pieces facing each other to the pivotal axis of the movable iron member be kept within the range of 0.1 to 3 relative units, assuming for the relative unit the maximum distance from the edge of the movable iron member to its pivotal axis.

As has been mentioned above, the change of the gap permeance can also be achieved in the preferred constructional form of the invention by changing the length of the magnetic gap. To this end, the pole-pieces 5 and 6 are so arranged as to be at an angle to the plane of the movable member 8.

The magnetic gaps 13 and 14 between each two parts of the split pole-pieces 5 and 6 and the movable iron member 8 (see FIG. 1) are symmetrical relative to the plane which is formed when the movable iron member 8 is being rotated. Owing to this, forces caused by the interaction of the pole-pieces with the movable iron member and directed along the pivotal axis of the movable member are balanced.

The pole-pieces 5 and 6 cover almost the whole area of the movable member and, thus, serve at the same time as a shield from the effects of external magnetic fields.

The adjustment of the operating mechanism can be easily effected, for example, by rotating the pole-pieces 5 and 6 relative to the points at which they are fastened to the main core 1, with the fixing screws 3 and 4 released.

The outline formed by the movable member and pole-pieces when the above-mentioned ratios are observed in the common case, could be mould curves or approximated by certain geometrical figures, e.g., Archimedes spiral etc.

One or the other form of curves determining the outline is chosen in accordance with one or the other character of the scale that is desired to be obtained.

FIGS. 3, 4, 5, 6, 7 and 8 show some of the exemplary embodiments of the movable iron member, where the movable iron member 8 is mounted on the spindle 9. The movable iron member having the shape shown in FIG. 3 may be recommended as the simplest one for use in instruments with a quadratic scale.

Figure 3:
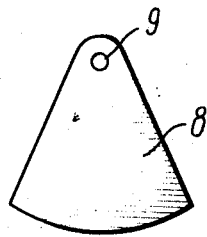
FIGS. 3, 4, 5, 6, 7 and 8 show possible embodiments of the movable iron member.
Figure 4:
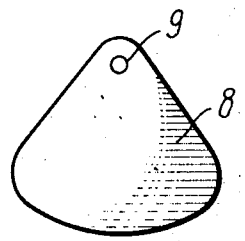

The movable iron member shown in FIG. 4 permits of increasing the angle of the scale in comparison to that shown in FIG. 3.

Figure 5:
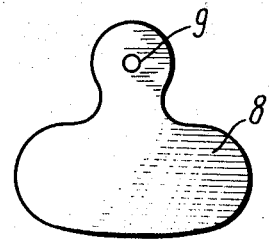

The shape of the movable iron member shown in FIG. 5 may be recommended for use in instruments with a relatively evenly divided scale.

Figure 6:
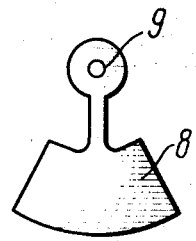

The shape of the movable iron member shown in FIG. 6 may be recommended for use in instruments with a pointer of relatively great weight, which, in this case, is balanced by the portion of the movable member more remote from the axis.

Figure 7:
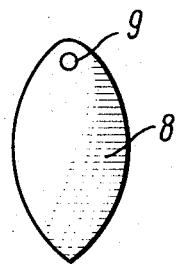

The shape of the movable iron member shown in FIG. 7 may be recommended for use in instruments with a scale angle of up to 320°.

Figure 8:
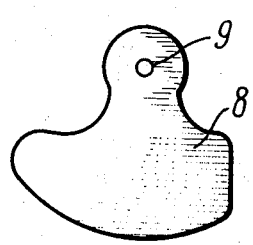

The shape of the movable iron member shown in FIG. 8 may be recommended for use in instruments with a compressed scale at its end.

It is preferable that the outlines of the figures be such that with full deflection of the movable member, the ratio of the area of the gap formed by the movable iron member and the internal pole-piece to the area of the gap formed by the movable iron member and the external pole-piece is kept within the range of 0.5 to 10.

It is also expedient that the weight of the active portion of the movable system of the operating mechanism comprise 30–60% of the weight of the constructive elements (which do not participate in producing the torque) of the movable system.

The movable system of the operating mechanism, according to the present invention, can be mounted both on a rigid spindle with bearings and on band suspensions, and any type of dampers (air, liquid or inductive) can be used. All these elements are not shown in the drawings as they do not relate to the concept of the invention, and in the description they are embraced by the term "constructive elements."

Figure 2:
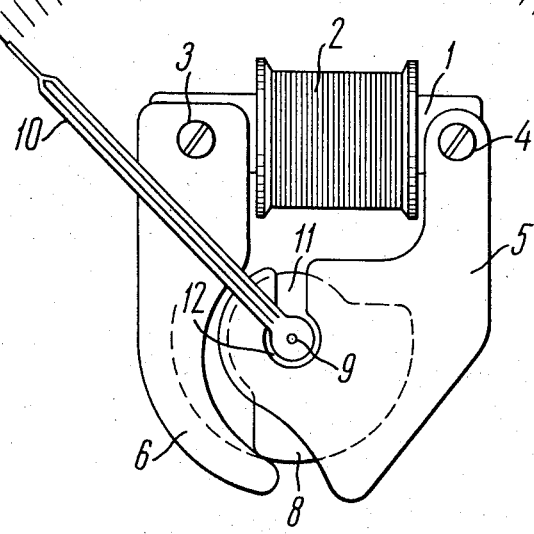
Figure 9:
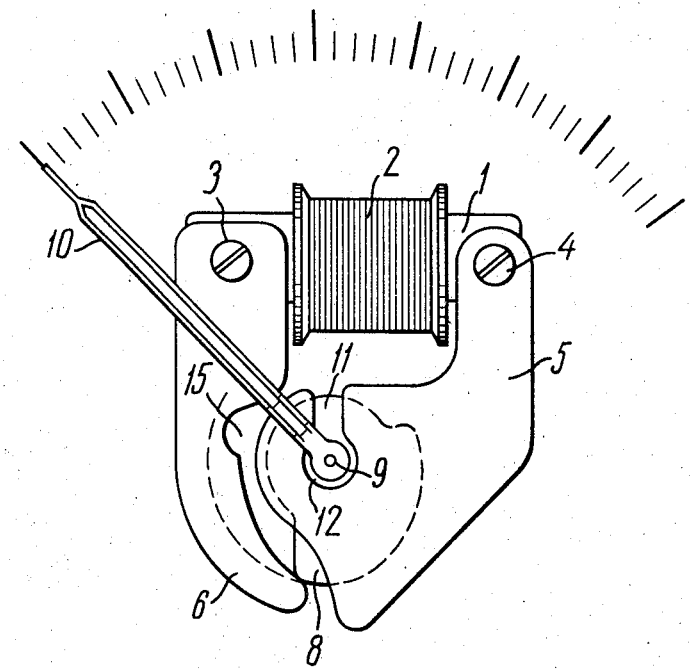
FIG. 9 is the moving-iron operating mechanism of the present invention made for an ammeter or voltmeter having a compressed scale portion; and·

FIG. 9 shows an exemplary embodiment of the external and internal pole-pieces of the fixed iron member for the case when it is necessary to obtain a scale with a compressed portion. The designations of parts in FIG. 9 are analogous to that of FIG. 1. The difference in the construction in comparison with the instrument shown in FIG. 1 is caused by the above-mentioned requirements and consists in variation in the form of the external pole-piece 6 having a slot 15 on the inner side thereof.

It goes without saying that such a slot or projection can be made both on the external and internal pole-pieces and also on the movable member, and the desired ratios of their areas and weights are preferably to be within stipulated limits.

Figure 10:
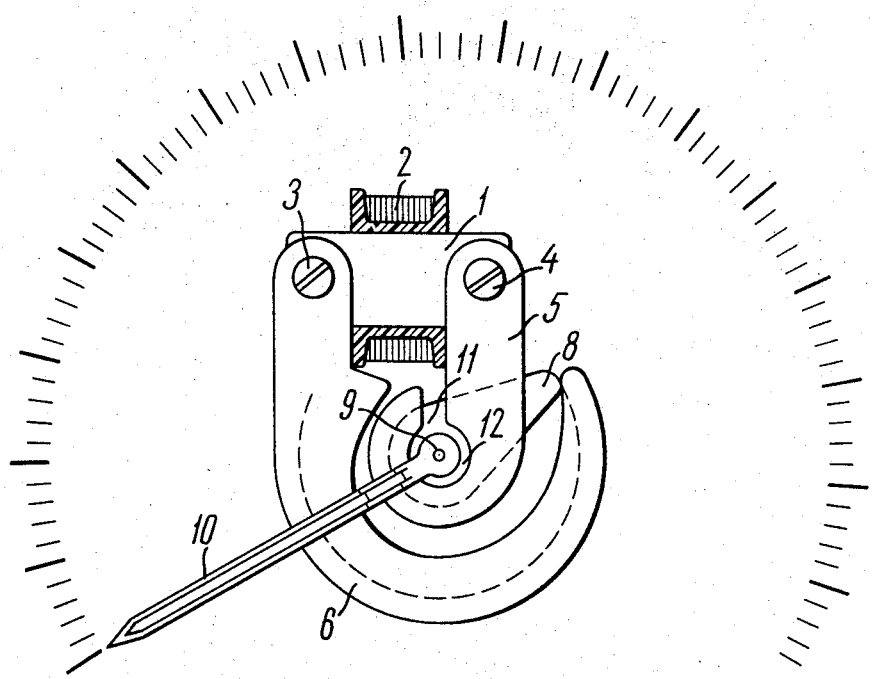
FIG. 10 is the moving-iron operating part of an instrument with a deflection angle up to 320°.

FIG. 10 shows an embodiment of the present invention for obtaining a large-deflection scale with the deflection angle of the pointer greater than 270°. All designations of FIG. 10 are analogous to those of FIG. 1. The difference consists in the fact that for increasing the deflection angle of the pointer, the external pole-piece 6 is made to embrace the internal pole-piece 5 through the angle of up to 320°.

If, according to the present conditions, the operating mechanism should have a high-resistance measuring circuit as is the case with, for example, voltmeters, it is expedient that the measuring coil be wound from wire of resistivity higher than $$00.3 \frac{\text{ohm} \cdot \text{mm.}^2}{\text{m.}}$$

e.g. from manganin. Such a design makes it possible to avoid the additional resistance commonly used in known operating mechanisms and to eliminate temperature error of the instrument caused by the temperature coefficient of copper.

It should be borne in mind that the embodiments of the present invention illustrated in the drawings and described in detail are practical and preferred forms thereof. Various changes in form, dimensions and arrangement of different elements can be made without departing from the spirit and scope of the invention as will be easily understood by those skilled in the art. For example, the elements shown in the drawings and described above can be replaced by equivalent ones, the position of separate details can be changed, some elements can be used independently of the others; all these changes and variation do not constitute departures from the spirit and scope of the invention.

We claim:

1. In a moving-iron instrument in combination a fixed member of non-permanent magnetic material having split pole-pieces each of which forms a slot; a coil associated with said fixed member for producing a magnetic field between said pole-pieces; a movable iron member, placed in said slot between said pole-pieces to form an air gap therewith and adapted to be turned when the magnetic flux is altered; a spindle for mounting said movable member in bearings; said movable member being a plate asymmetrical relative to said spindle and placed in the slots of said pole-pieces in such a way that the magnetic flux in one portion of said movable member is directed parallel to the surfaces forming the areas of the gap; said pole-pieces being different in shape and asymmetrical to each other with respect to said spindle of said movable member.

2. In a moving-iron instrument in combination a fixed member of non-permanent magnetic material having split pole-pieces each of which forms a slot; a coil associated with said fixed member for producing a magnetic field between said pole-pieces; a movable iron member, placed in said slots between said pole-pieces to form an air gap therewith and adapted to be turned when said magnetic flux is altered; a spindle for mounting said movable member in bearings; said movable member being a plate asymmetrical with respect to said spindle and placed in the slots of said pole-pieces in such a way that the magnetic flux in one portion of said movable member is directed parallel to the surfaces forming the areas of the gap; said pole-pieces being different in shape and asymmetrical to each other with respect to the pivotal axis of said movable member, the shape of said movable member being so selected that the ratio of the distance from the pivotal axis of the movable member to the point nearest to said axis and lying on that edge of the movable member which moves in the slot of the pole-piece more remote from said pivotal axis to the distance from the pivotal axis of said movable member to the point most remote from the axis and lying on the same edge is kept within the range of 0.1 to 1, while the shape of said pole-pieces is so selected that the distance from said axis to the points of said pole-pieces lying on their edges facing each other is kept within the range of 0.1 to 3 relative units, assuming for a relative unit the maximum distance of the edge of said movable member to its pivotal axis.

3. In a moving-iron instrument in combination a fixed member of non-permanent magnetic material having split pole-pieces each of which forms a slot; a coil associated with said fixed member for producing a magnetic flux between said pole-pieces; an iron movable member placed in said slots between said pole-pieces to form an air gap therewith and adapted to be turned when the magnetic flux is altered; a spindle for mounting said movable member in bearings; said movable member being a plate asymmetrical with respect to said spindle and placed in the slot of said pole-pieces in such a way that the magnetic flux in one portion of said movable member is directed parallel to the surfaces forming the gap areas; said pole-pieces being different in shape and asymmetrical to each other with respect to the pivotal axis of said movable member, the pole-piece more remote from said pivotal axis of the movable member being made so that it embraces the pole-piece which is nearer to said axis through an angle of 320°, the shape of said movable member being so selected that the ratio of the distance from the pivotal axis of the movable member to the point nearest to said axis and lying on that edge of the movable member which moves in the slot of the pole-piece more remote from said pivotal axis to the distance from the pivotal axis of said movable member to the point most remote from said axis and lying on the same edge is kept within the range of 0.1 to 1, while the shape of said pole-pieces is so selected that the distance from the axis to the points of the pole-pieces lying on their edges facing each other is kept within the range of 0.1 to 3 relative units, assuming for a relative unit the maximum distance from the edge of said movable member to its pivotal axis.

4. In a moving-iron instrument in combination a fixed member of non-permanent magnetic material having split pole-pieces each of which forms a slot; a coil associated with said fixed member for producing a magnetic flux between said pole-pieces; means for movable connection of said pole-pieces with the central portion of said fixed member, for adjustment by turning said pole-pieces; a movable iron member placed in said slot between said pole-pieces to form an air gap therewith and adapted to be turned when the magnetic flux is altered; a spindle for mounting said movable member in bearings; said movable member being a plate asymmetrical with respect to said spindle and placed in the slots of said pole-pieces so that the magnetic flux in one portion of said movable member is directed parallel to the surfaces forming the gap areas; said pole-pieces being different in shape and asymmetrical to each other with respect to the pivotal axis of said movable member, the shape of said movable member being so selected that the ratio of the distance from the pivotal axis of the movable member to the point nearest to said axis and lying on that edge of the movable member which moves in the slot of the pole-piece more remote from said axis to the distance from the pivotal axis of said movable member to the point most remote from said axis and lying on the same edge is kept within the range of 0.1 to 1, while the shape of the pole-pieces is so selected that the distance from the axis to the points of the pole-pieces lying on their edges facing each other is kept within the range of 0.1 to 3 relative units, assuming for a relative unit the maximum distance of the movable member edge to its pivotal axis.

5. In a moving-iron instrument in combination a fixed member of non-permanent magnetic material having pole-pieces and means for movable connection of said pole-pieces with the central portion of said fixed member, for adjustment by turning said pole-pieces, the latter each being split and forming a slot; a coil associated with said fixed member for producing a magnetic flux between said poles-pieces; a movable iron member, placed in said slots between said pole-pieces to form an air gap therewith and adapted to be turned when the magnetic flux is altered; a spindle for mounting said movable member in bearings; said movable member being a plate asymmetrical with respect to said spindle and placed in the slots of said pole-pieces in such a way that the magnetic flux in one portion of said movable member is directed parallel to the surfaces forming the gap areas; said pole-pieces being different in shape and asymmetrical to each other with respect to the pivotal axis of said movable member, the pole-piece more remote from said pivotal axis being made in such a way that it embraces the pole-piece which is nearer to said axis through the angle of up to 320°, the shape of said movable member being so selected that the ratio of the distance from the pivotal axis of the movable member to the point nearest to said axis and lying on that edge of the movable member which moves in the slot of the pole-piece more remote from said pivotal axis to the distance from the pivotal axis of said movable member to the point most remote from said pivotal axis and lying on the same edge is kept within the range of 0.1 to 1, while the shape of said pole-pieces being so selected that the distance from the axis to the points of said pole-pieces lying on their edges facing each other is kept within the range of 0.1 to 3 relative units, assuming for a relative unit the maximum distance from the edge of said movable member to its pivotal axis.

6. In a moving-iron instrument in combination a fixed member of non-permanent magnetic material, having split pole-pieces each of which forms a slot; a coil made from wire having resistivity greater than $$0.03 \frac{\text{ohm} \cdot \text{mm.}^2}{\text{m.}}$$

connected with said fixed member for producing magnetic flux between said pole-pieces; a movable iron member placed in the slots between said pole-pieces to form an air gap therewith and adapted to be turned when the magnetic flux is altered; a spindle for mounting said movable member in bearings; said movable member being a plate asymmetrical with respect to said spindle and placed in the slots of said pole-pieces in such a way that the magnetic flux in one portion of said movable member is directed parallel to the surfaces forming the gap areas; said pole-pieces being different in shape and asymmetrical to each other with respect to the pivotal axis of said movable member.

7. In a moving-iron instrument in combination a fixed member of non-permanent magnetic material having split pole-pieces each of which forms a slot; a coil made from wire having resistivity greater than $$0.03 \frac{\text{ohm} \cdot \text{mm.}^2}{\text{m.}}$$

connected with said fixed member for producing magnetic flux between said pole-pieces; a movable iron member placed in said slots between said pole-pieces and adapted to be turned when the magnetic flux is altered; a spindle for mounting said movable member in bearings; said movable member being a plate asymmetrical with respect to said spindle and placed in the slots of said pole-pieces in such a way that the magnetic flux in one portion of said movable member is directed parallel to the surfaces forming the areas of the gap; said pole-pieces being different in shape and asymmetrical to each other with respect to the pivotal axis of said movable member, the shape of said movable member being so selected that the ratio of the distance from the pivotal axis of the movable member to the point nearest to said axis and lying on that edge of the movable member which moves in the slot of the pole-piece more remote from said axis to the distance from the axis of said movable member to the point most remote from said axis and lying on the same edge is kept within the range of 0.1 to 1, while the shape of said pole-pieces is so selected that the distance from said axis to the points of said pole-pieces lying on their edges facing each other is kept within the range of 0.1 to 3 relative units, assuming for a relative unit the maximum distance from the edge of said movable member to its pivotal axis.

8. In a moving-iron instrument in combination a fixed member of non-permanent magnetic material having split pole-pieces each of which forms a slot; a coil made from wire having resistivity greater than $$0.03 \frac{\text{ohm} \cdot \text{mm.}^2}{\text{m.}}$$

connected with said fixed member for producing magnetic flux between said pole-pieces; a movable iron member placed in said slots between said pole-pieces to form an air gap therewith and adapted to be turned when the magnetic flux is altered; a spindle for mounting said movable member in bearings; said movable member being a plate asymmetrical with respect to said spindle and placed in the slots of said pole-pieces in such a way that the magnetic flux in one portion of said movable member is directed parallel to the surfaces forming the areas of the gap; said pole-pieces being different in shape and asymmetrical to each other with respect to the pivotal axis of said movable member, the pole-piece more remote from said axis being made in such way that it embraces the pole-piece which is nearer to said axis through the angle of up to 320°, the shape of said movable member being so selected that the ratio of the distance from the pivotal axis of the movable member to the point nearest to this axis and lying on that edge of the movable member which moves in the slot of the pole-piece most remote from said pivotal axis to the distance from the pivotal axis of said movable member to the point most remote from said axis and lying on the same edge is kept within the range of 0.1 to 1, while the shape of said pole-pieces is so selected that the distance from said pivotal axis to the points of said pole-pieces lying on their edges facing each other is kept within the range of 0.1 to 3 relative units, assuming for a relative unit the maximum distance from the edge of said removable member to its pivotal axis.

9. In a moving-iron instrument in combination a fixed member of non-permanent magnetic material having pole-pieces and means for movable connection of said pole-pieces with the central portion of said fixed member, said pole-pieces each being split and forming a slot; a coil made from wire having resistivity greater than $$0.03 \frac{\text{ohm} \cdot \text{mm.}^2}{\text{m.}}$$

connected with said fixed member for producing magnetic flux between said pole-pieces; a movable iron member, placed in the slots between said pole-pieces to form an air gap therewith and adapted to be turned when the magnetic flux is altered; a spindle for mounting said movable member in bearings; said movable member being a plate asymmetrical with respect to said spindle and placed in said slots of said pole-pieces in such a way that the magnetic flux in one portion of said movable member is directed parallel to the surfaces forming the areas of the gap; said pole-pieces being different in shape and asymmetrical to each other with respect to said axis of said movable member.

10. In a moving-iron instrument in combination a fixed member of non-permanent magnetic material having pole-pieces; means for movable connection of said pole-pieces with the central portion of said fixed member, for adjustment by turning said pole-pieces, said pole-pieces each being split and forming a slot; a coil made from wire having resistivity greater than $$0.03 \frac{\text{ohm} \cdot \text{mm.}^2}{\text{m.}}$$

connected with said fixed member for producing magnetic flux between said pole-pieces; a movable iron member, placed in the slots between said pole-pieces to form an air gap therewith and adapted to be turned when the magnetic flux is altered; a spindle for mounting said movable member in bearings; said movable member fashioned as a plate asymmetrical with respect to said spindle and placed in said slots of said pole-pieces in such a way that the magnetic flux in one portion of said movable member is directed parallel to the surfaces forming the areas of the gap; said pole-pieces being different in shape and asymmetrical to each other with respect to the pivotal axis of said movable member, the shape of said movable member being so selected that the ratio of the distance from the pivotal axis of the movable member to the point nearest to this axis and lying on that edge of the movable member which moves in the slot of the pole-piece most remote from said pivotal axis to the distance from the pivotal axis of said movable member to the point most remote from said axis and lying on the same edge is kept within the range from 0.1 to 1, while the shape of said pole-pieces is so selected that the distance from the axis to the points of said pole-pieces lying on their edges facing each other is kept within the range of 0.1 to 3 relative units, assuming for a relative unit the maximum distance from the edge of said movable member to its pivotal axis.

11. In a moving-iron instrument in combination a fixed member of non-permanent magnetic material having pole-pieces; means for movable connection of said pole-pieces with the central portion of said fixed member, for adjustment by turning said pole-pieces, said pole-pieces each being split and forming a slot; a coil made from wire having resistivity greater than $$0.03 \frac{\text{ohm} \cdot \text{mm.}^2}{\text{m.}}$$

connected with said fixed member for producing magnetic flux between said pole-pieces; a movable iron member placed in the slots between said pole-pieces to form an air gap therewith and adapted to be turned when the magnetic flux is altered; a spindle for mounting said movable member in bearings; said movable member being a plate asymmetrical with respect to said spindle and placed in said slots of said pole-pieces in such a way that the magnetic flux in one portion of said movable member is directed parallel to the surfaces forming the areas of the gap; said pole-pieces being different in shape and asymmetrical to each other with respect to the pivotal axis of said movable member, the pole-piece more remote from said pivotal axis being made in such a way that it embraces a pole-piece which is nearer to said axis through the angle of up to 320°, the shape of said movable member being so selected that the ratio of the distance from the axis of the movable member to the point nearest to said axis and lying on that edge of the movable member which moves in the slot of the pole-piece more remote from said pivotal axis to the distance from the pivotal axis of said movable member to the point most remote from the axis and lying on the same edge is kept within the range of 0.1 to 1, while the shape of said pole-pieces is selected in such a way that the distance from the axis to the points of said pole-pieces lying on their edges facing each other is kept within the range of 0.1 to 3 relative units, assuming for a relative unit the maximum distance from the edge of said movable member to its pivotal axis.

References Cited

UNITED STATES PATENTS

| 2,002,445 | 5/1935 | Arey et al. | 324—146 |
| 2,175,046 | 10/1939 | Warner. | |
| 3,130,365 | 4/1964 | Minter | 324—132 X |

ALFRED E. SMITH, Primary Examiner

U.S. Cl. X.R.

335—281